(12) United States Patent
Vihtari et al.

(10) Patent No.: US 9,917,772 B2
(45) Date of Patent: Mar. 13, 2018

(54) DIAMETER MESSAGE MIRRORING AND SPOOFING

(71) Applicant: ALCATEL LUCENT CANADA, INC., Ottawa (CA)

(72) Inventors: Mike Vihtari, Kanata (CA); Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1068 days.

(21) Appl. No.: 13/899,703

(22) Filed: May 22, 2013

(65) Prior Publication Data

US 2013/0322448 A1    Dec. 5, 2013

Related U.S. Application Data

(63) Continuation-in-part of application No. 13/482,690, filed on May 29, 2012, and a continuation-in-part of application No. 13/482,587, filed on May 29, 2012, now Pat. No. 8,804,931, and a continuation-in-part of application No. 13/602,579, filed on Sep. 4, 2012, now Pat. No. 8,850,064.

(51) Int. Cl.
*G06F 15/16* (2006.01)
*H04L 12/741* (2013.01)
*H04L 12/725* (2013.01)

(52) U.S. Cl.
CPC ............ *H04L 45/74* (2013.01); *H04L 45/304* (2013.01)

(58) Field of Classification Search
CPC ................. H04L 63/0892; H04L 12/14; H04L 2012/5636; H04L 45/38; H04L 12/1407; H04L 45/74; H04L 45/304
USPC ........................................................ 709/204
See application file for complete search history.

(56) References Cited

U.S. PATENT DOCUMENTS

| | | | |
|---|---|---|---|
| 2007/0184860 A1* | 8/2007 | Jansson | H04L 12/5895 455/466 |
| 2012/0158995 A1* | 6/2012 | McNamee | H04L 45/306 709/238 |
| 2012/0221899 A1* | 8/2012 | Cervenak | G06Q 10/10 714/48 |
| 2013/0235736 A1* | 9/2013 | Khadri | H04L 43/10 370/250 |

* cited by examiner

*Primary Examiner* — Bryan Lee
*Assistant Examiner* — Oluwatosin Gidado
(74) *Attorney, Agent, or Firm* — Kramer & Amado, P.C.

(57) ABSTRACT

Various exemplary embodiments relate to a method and related network node including one or more of the following: receiving a Diameter message at the DRA from an origin device, wherein the Diameter message includes a first destination address; establishing a context object based on receiving the Diameter message, wherein the context object is associated with a copy of the Diameter message; evaluating at least one rule, comprising modifying, based on a first reference to the context object, the copy to include a second destination address, and transmitting the copy to another device based on the second destination address.

24 Claims, 5 Drawing Sheets

| | 610 | 620 | 630 |
|---|---|---|---|
| | Profile Name | Host | Realm |
| 640 | Warm-redundancy | Backup-Host-A | Our-Private-Realm |
| 650 | Lawful-intercept | ReportingServer | FBI-Realm |
| | | ReportingServer | CIA-Realm |
| 660 | ... | ... | ... |
*FIG. 6*
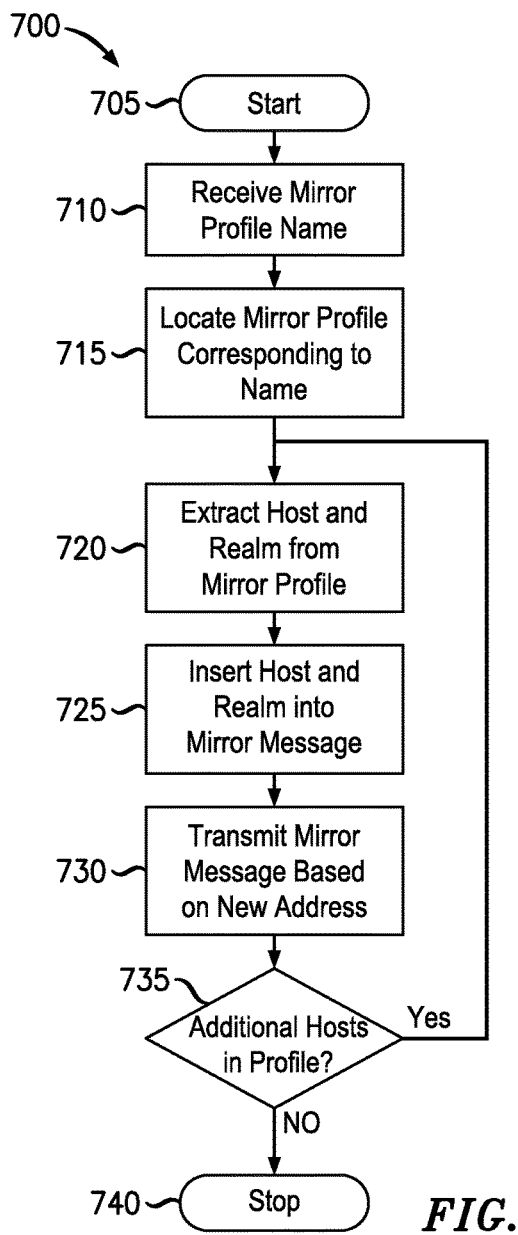
*FIG. 7*
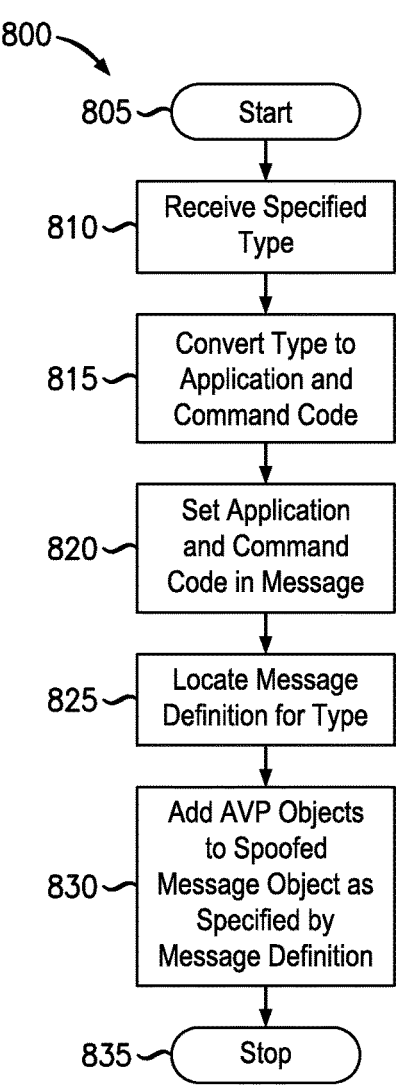
*FIG. 8*

DIAMETER MESSAGE MIRRORING AND SPOOFING

CROSS-REFERENCE TO RELATED APPLICATIONS

This application is a continuation-in-part of the following co-pending applications, which are hereby incorporated by reference for all purposes as if fully set forth herein: application Ser. No. 13/482,690, filed on May 29, 2012, "ORGANIZATION OF DIAMETER ROUTING AGENT RULE SETS;" application Ser. No. 13/482,587, filed on May 29, 2012, "ROUTING DECISION CONTEXT OBJECTS;" application Ser. No. 13/602,579, filed on Sep. 4, 2012, "RULE ENGINE EVALUATION OF CONTEXT OBJECTS."

TECHNICAL FIELD

Various exemplary embodiments disclosed herein relate generally to communications networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAB) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a Diameter Routing Agent (DRA) for processing a Diameter message, the method including: receiving a Diameter message at the DRA from an origin device, wherein the Diameter message includes a first destination address; establishing a context object based on receiving the Diameter message, wherein the context object is associated with a copy of the Diameter message; evaluating at least one rule, including modifying, based on a first reference to the context object, the copy to include a second destination address, and transmitting the copy to another device based on the second destination address.

Various embodiments described herein relate to a Diameter Routing Agent (DRA) for processing a Diameter message, the DRA including: a rule storage configured to store at least one rule; a Diameter stack configured to receive a Diameter message from an origin device, wherein the Diameter message includes a first destination address; a context creator configured to establish a context object based on receiving the Diameter message, wherein the context object is associated with a copy of the Diameter message; a rule engine configured to evaluate the at least one rule, wherein the evaluation includes modifying, based on a first reference to the context object, the copy to include a second destination address; and a message handler configured to transmit, via the Diameter stack, the copy to another device based on the second destination address.

Various embodiments described herein relate to a non-transitory machine readable storage medium encoded with instructions for execution by a Diameter Routing Agent (DRA) for processing a Diameter message, the medium including: instructions for receiving a Diameter message at the DRA from an origin device, wherein the Diameter message includes a first destination address; instructions for establishing a context object based on receiving the Diameter message, wherein the context object is associated with a copy of the Diameter message; instructions for evaluating at least one rule, including instructions for modifying, based on a first reference to the context object, the copy to include a second destination address, and instructions for transmitting the copy to another device based on the second destination address.

Various embodiments additionally include transmitting the Diameter message based on the first destination address.

Various embodiments are described wherein: transmitting the copy is performed based on a second reference to the context object, and evaluating at least one rule further includes: modifying, based on a third reference to the context object, the copy to include a third destination address, and transmitting, based on a fourth reference to the context object, the copy based on the third destination address.

Various embodiments are described wherein evaluating at least one rule further includes: modifying, based on a third reference to the context object, at least one attribute value pair (AVP) of the copy.

Various embodiments additionally include establishing a spoofed message context object; wherein evaluating at least one rule further includes: setting, based on a first reference to the spoofed message context object, a message type of the spoofed message context object, determining, based on the message context object, a set of attribute value pairs (AVPs) associated with the message type, and constructing a spoofed message including the set of AVPs; and transmitting the spoofed message.

Various embodiments are described wherein the first reference to the context object identifies a mirror profile; and modifying the copy to include a second destination address includes extracting the second destination address from the mirror profile.

Various embodiments are described wherein evaluating at least one rule further includes, setting, based on a second reference to the spoofed message context object, a source address of the spoofed message, wherein the source address is different from an address of the DRA.

Various embodiments are described wherein establishing the spoofed message context object is performed based on receiving, by the DRA from the other device, a message responding to the copy.

BRIEF DESCRIPTION OF THE DRAWINGS

In order to better understand various exemplary embodiments, reference is made to the accompanying drawings, wherein:

FIG. 6 illustrates an exemplary data arrangement for storing mirror profiles;

FIG. 7 illustrates an exemplary method for processing a mirror instruction including a reference to a mirror profile; and FIG. 8 illustrates an exemplary method for associating a spoofed message context object with a specified message type.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. For example, it would be desirable to allow a user to define rules that instruct the DRA to mirror or spoof Diameter and other messages.

In some situations, it may be desirable to send a copy of a received message to another device. For example, a user may wish to mirror some received messages to one or more law enforcement entities. As another example, a user may wish to "warm up" a new or redundant device by mirroring receive messages for the device to process. In this example, the new or redundant device may expect further communications via the DRA. To ensure proper continued operation of the new or redundant device, the user may wish to "spoof" messages at the DRA by creating and sending messages that appear to be originally sent by another device with which the new or redundant device expects to communicate. Additional uses for the concepts described herein will be apparent.

Figure 1:
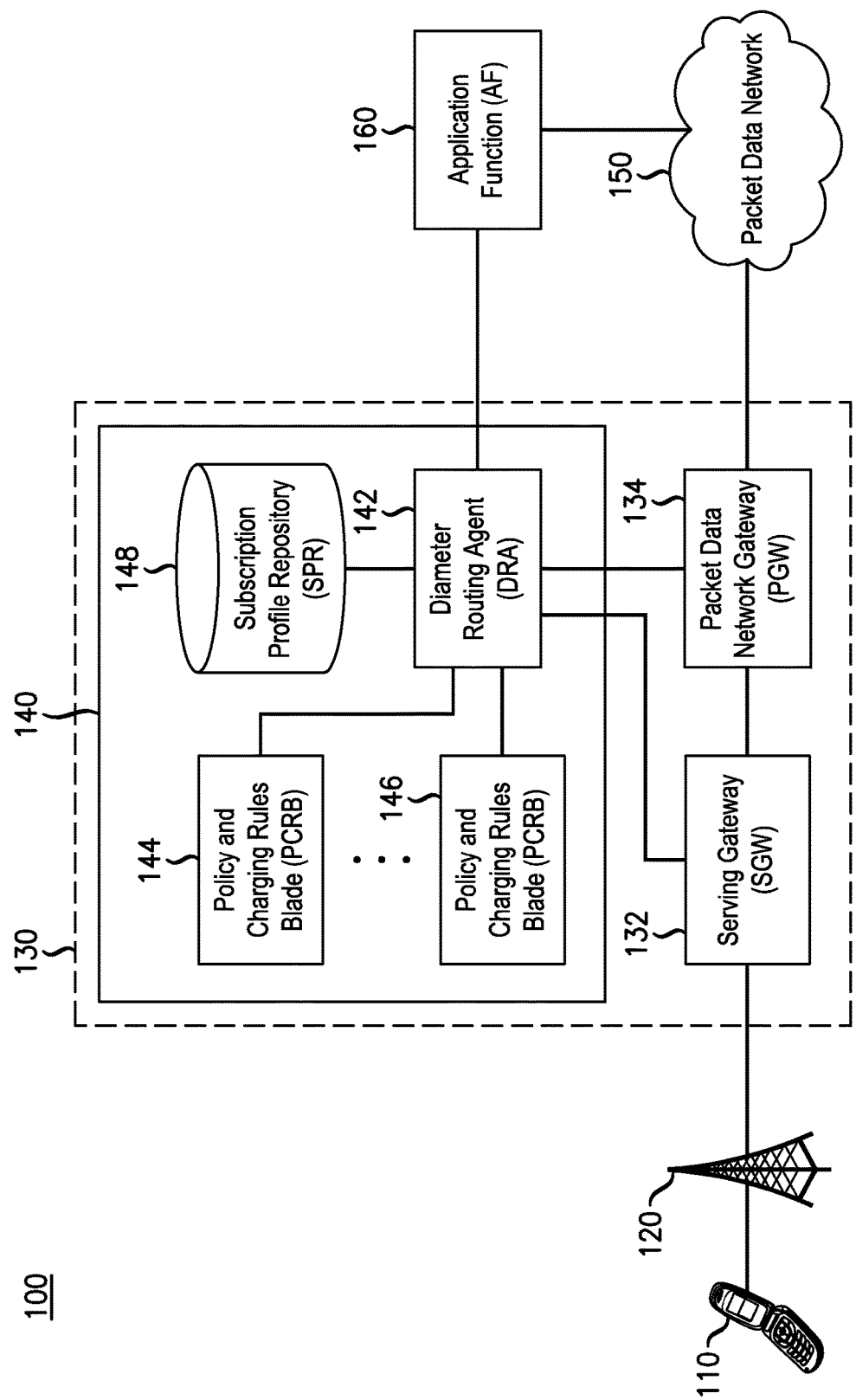
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository 148.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules.

Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
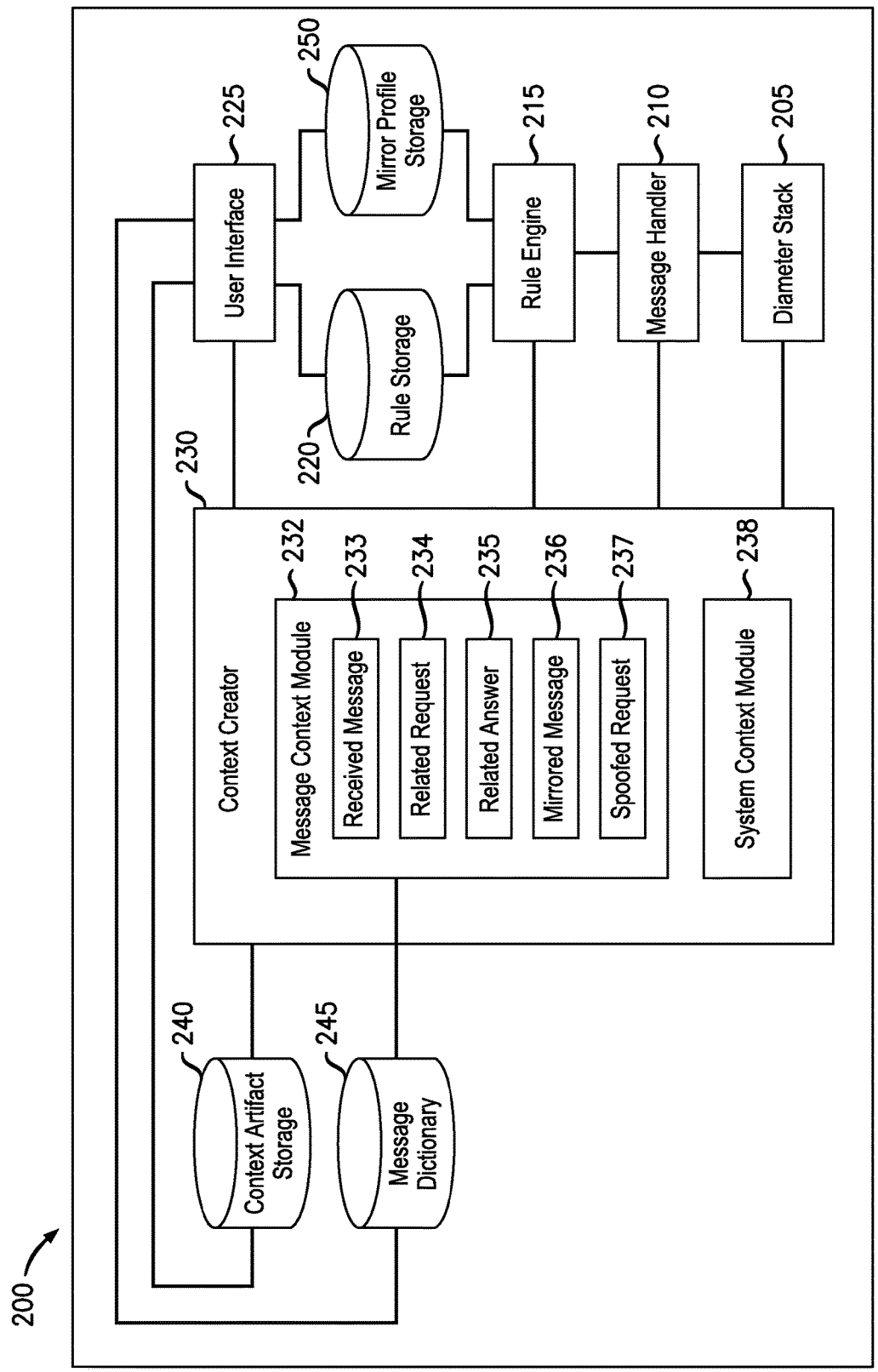
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, or mirror profile storage 250.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more results of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a load balancer context, or a system context. These context artifacts may be used by context creator 230 at run-time to instantiate different types of context objects. As such, context creator 230 may be viewed as including a message context module 232, a load balancer context module 236, and a system context module 238. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. Further, in some embodiments, the message context module 232 may be configured to generate context objects representing a mirrored message or a spoofed message. As such, message context module 232 may be viewed as including a received message submodule 233, a related request submodule 234, a related answer submodule 235, a mirrored message submodule 236, and a spoofed request submodule 237.

The contents of Diameter messages may vary depending on the application and command type. For example, an Rx RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

In some embodiments, the DRA 200 may support mirroring of messages using a mirrored message context. In such embodiments, the message context module 232 may instantiate a mirrored message context object and associate the object with a copy of the received message. For example, the DRA 200 may instruct the Diameter stack 205 to duplicate the received Diameter message or may copy the data of the received message into the mirrored message context object for later use in constructing an outgoing message. The mirrored message context object may provide the rule engine with the ability to modify the destination of the copied message, to modify other AVPs of the copied message, and to send the copied message as currently modified to another device. It will be understood that the mirroring functionality described herein may be alternatively achieved without using a dedicated mirrored message context object and, instead, may be incorporated into another context object such as a received message context object or a system context object.

In various embodiments, the mirroring functionality described herein may be supplemented or otherwise utilize one or more mirror profiles stored in the mirror profile storage 250. As such, mirror profile storage 250 may be any machine-readable medium capable of storing mirror profiles. Accordingly, mirror profile storage 250 may include a machine-readable storage medium such as read-only memory (ROM), random-access memory (RAM), magnetic disk storage media, optical storage media, flash-memory devices, and/or similar storage media. In such embodiments, the user interface 225 may be further configured to access and modify the contents of the mirror profile storage 250.

The mirrored message context object may be used by the user to define rules for sending copies of a received message to another device. For example, the user may wish to mirror received messages that match some profile or identity in compliance with the requirements of various law enforcement agencies. As another example, message mirroring may be used to "warm up" a newly-installed node by replicating messages to the new node before it takes over for a legacy node. Such mirroring may allow the new node to populate its datastores before assuming ownership of network activities. In both examples, it may be necessary or useful to manipulate the contents of the message prior to mirroring. Additional uses for the mirrored message context object may include, for example, logging network activity at a separate server, maintaining electronic data records, or replication of messages to multiple processing servers. Various additional uses will be apparent.

In some embodiments, the DRA 200 may support spoofing of messages using a spoofed message context. Upon the DRA 200 receiving a message or encountering a rule referencing a new spoofed message context, the message context module 237 may instantiate a new spoofed message context object and create a new message to be associated with the object. For example, the message context object may instruct the Diameter stack 205 to create a new Diameter message or may copy standard Diameter message data into the spoofed message context object for later use in constructing an outgoing message. Further, at some point the message context module 237 may determine a message type to be associated with the spoofed message. For example, an instruction evaluated by the rule engine 215 may specify a message type or the message context module 232 may be preconfigured with a message type for use immediately upon, or concurrently with, instantiating the spoofed message context object. Based on the message type, the message context module may include any appropriate AVP objects for the message type, as defined in the message dictionary.

The spoofed message context object may be used by the user to define rules for spoofing messages to another device. For example, in the case where a message has been mirrored to a newly-installed node for "warm up" purposes, the new node may respond to the mirrored message as if the node was already responsible for processing the message within the network. In this example, the DRA may intercept the response and not forward it to its intended destination and, instead, utilize the spoofed message context object to produce a fake message to send back to the new node. The fake message may appear to have been sent originally by the intended recipient of the response. In this way, the DRA 200 may be configured to "fake" communications between the new node and the rest of the network. Additional uses for the mirrored message context object may include, for example, keeping sessions and other data synced between live and redundant systems or "covering" for legacy systems that are not configured to transmit various messages expected by other nodes in the network. Various additional uses will be apparent.

An example of the enablement of backward compatibility possible through utilization of spoofed messages may involve a network includes a legacy deep packet inspection (DPI) device that does not support the 3GPP Diameter protocols for communication regarding session establishment. Upon establishment of a new session with a PGW, the DRA 200 may generate a spoofed message according to another application or protocol known to be understood by the DPI device and including any information needed by the DPI regarding the new session. In some embodiments, the spoofed message context object may further be capable of spoofing other protocols such as RADIUS, HTTP, or SS7. Various modifications to the methods described herein to support such other protocols will be apparent. For example, the spoofed message context object may implement a message converter that converts a Diameter message to another protocol.

As noted above, context creator 230 may be capable of defining other context objects that do not represent a Diameter message. Such context objects may be referred to as "computational contexts" and may also be defined by contexts artifacts in context artifact storage 240. As an example, the system context module 238 may generate a system context object. The system context object may provide access to various system level functionality. For example, the system context object may provide access to routing information stored in the Diameter stack 205, enable event logging, or enable administrator messaging via dialogs or email. Various alternative or additional system functionality to expose via the system context object will be apparent.

It should be noted that while rule storage 220, context artifact storage 240, message dictionary 245, and mirror profile storage 250 are illustrated as separate devices, one or more of these components may be resident on multiple storage devices. Further, one or more of these components may share a storage device. For example, rule storage 220, context artifact storage 240, message dictionary 245, and mirror profile configuration storage 250 may all refer to portions of the same hard disk or flash memory device.

Figure 3:
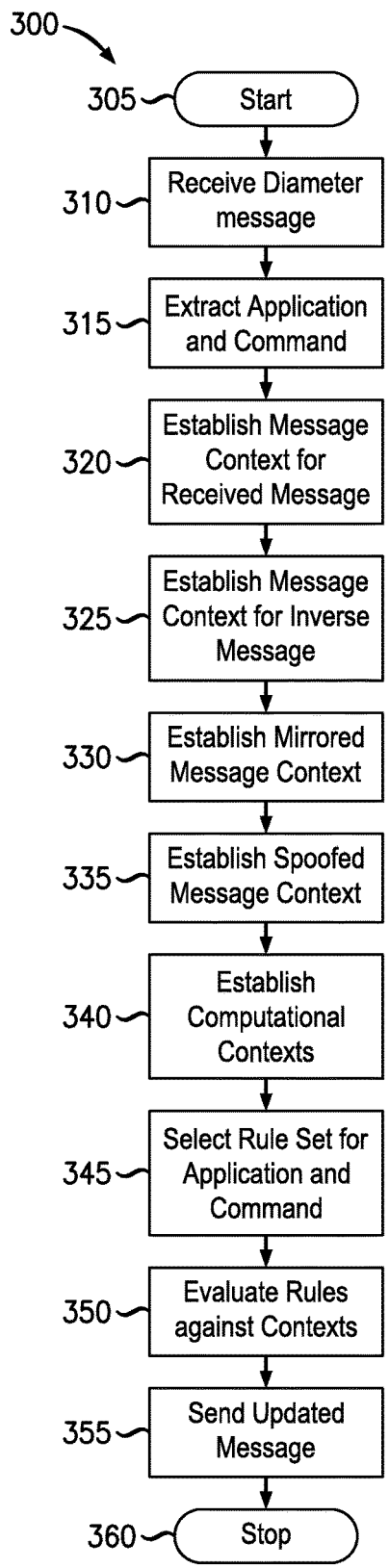
FIG. 3 illustrates an exemplary method for processing Diameter messages.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type.

In step 330, the DRA 200 may establish a mirrored message context object, including creating at least one copy of the received message for association with the mirrored message context object. Then, in step 335, the DRA 200 may establish a spoofed message context object, including creating at least one new message for association with the spoofed message context object. For both steps 330, 335, the DRA 200 may provide the context objects with appropriate structure for accessing the various AVPs of the underlying Diameter message, based on an associated message definition. In the case of the spoofed message context object, the DRA 200 may wait to provide at least part this structure until evaluation of a rule that specifies a message type for the underlying message.

The DRA 200 may then, in step 340, proceed to establish any other computational context objects for which the DRA 200 stores a context artifact or which the rule engine may request. For example, the DRA 200 may establish a system context object. After the appropriate context objects have been at least instantiated, method 300 may proceed to step 345 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 350. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. As noted above, evaluation of a rule may result in instantiation or further modification to the structure of one or more spoofed message objects. Various additional uses for a reference to a context object will be apparent. After applying the appropriate rule sets, the DRA 200 may transmit one or more messages to other devices in step 355. For example, the DRA may forward the Diameter message, which may be modified, to another device or may transmit an answer back to the device that sent the received message. Method 300 may proceed to end in step 360.

Figure 4:
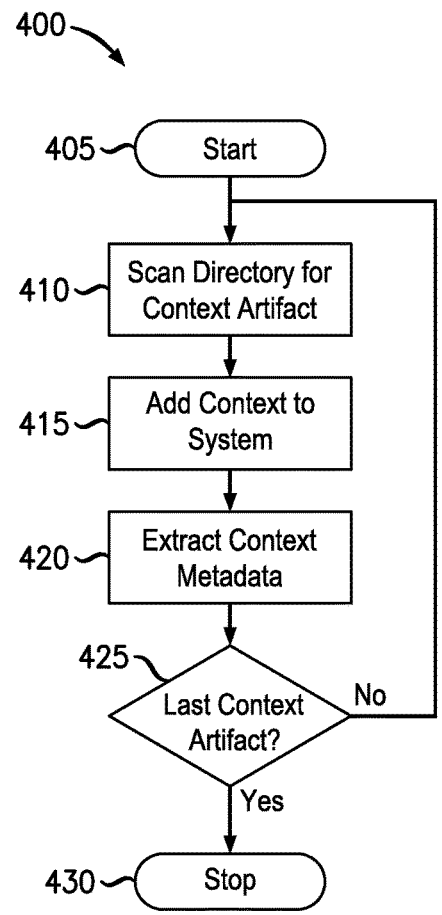
FIG. 4 illustrates an exemplary method for utilizing context artifacts.

FIG. 4 illustrates an exemplary method 400 for utilizing context artifacts. Method 400 may be performed by the components of DRA 200 such as, for example, user interface 225 or context creator 230. Method 400 may be performed, for example, upon system startup, upon request by user interface, or upon receiving a Diameter message. It will be understood that a context artifact may be used to define computational contexts as well as message contexts.

Method 400 may begin in step 405 and proceed to step 410 where the DRA may scan one or more directories for a context artifact to process. In various embodiments, the DRA may process all context artifacts located on a storage device or in a particular directory or may only process context artifacts specified in a list of artifacts to be processed. After locating a context artifact, method 400 may proceed to step 415, where the DRA may add a context object type to the system for use by a rule engine, a user interface, or a context creator. In various embodiments, such as embodiments wherein the context artifacts define one or more Java classes, step 415 may include interpreting the context artifact to enable instantiation of context objects having the context object type defined by the class. Various other methods for utilizing a context artifact to enable the use of new context object types will be apparent.

Next, in step 420, the DRA may extract any metadata for the context object type for the context object. For example, as will be explained in greater detail below with respect to FIG. 5, a context artifact may include annotations or tags that specify a user-friendly name for the context object type, attributes, or actions. The DRA may store this metadata for use by a user interface or rule engine. Next, in step 425, the DRA may determine whether additional context artifacts remain to be processed. If additional context artifacts remain, method 400 may loop back to step 410. Otherwise, method 400 may proceed to end in step 430.

Figure 5:
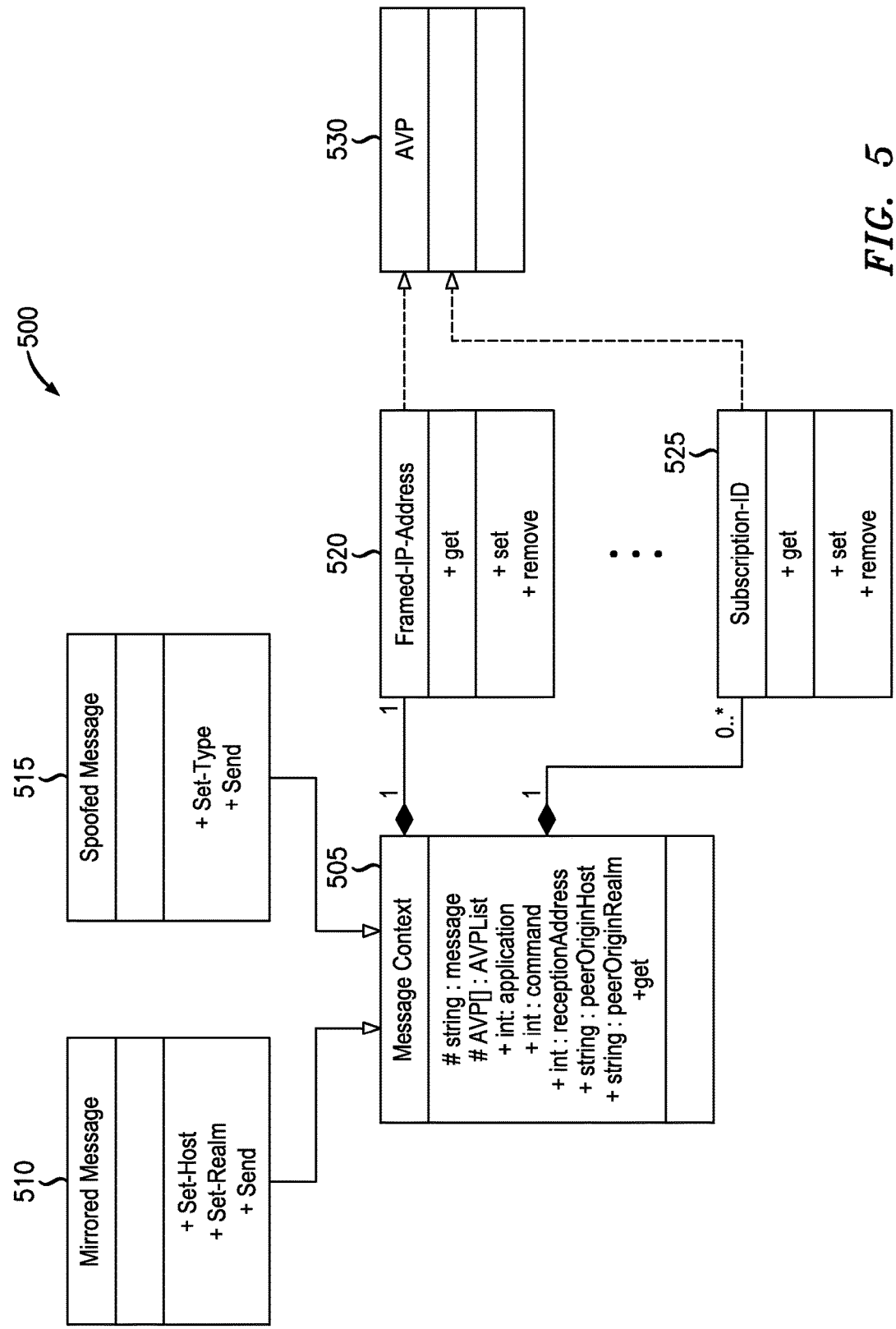
FIG. 5 illustrates an exemplary class diagram for mirrored message and spoofed message context objects.

FIG. 5 illustrates an exemplary class diagram 500 for a mirrored message context object 510 and a spoofed message context object 515. Class diagram 500 may indicate an actual implementation of message context objects or may describe a context object as viewed by a user even though an actual implementation differs. For example, as will be understood, a message context object may be implemented as a generic "Diameter message" class where the contents may include generic "AVP" objects that hold underlying binding data. Such AVP objects may be instantiated only on demand. Such an implementation may be accessible by a user in the same manner as an object implemented according to class diagram 500.

The context objects 510, 515 may both extend, or otherwise be a specific instantiation of a base message context object 505. Message context object 505 may define data and functions that may be generally used by any message context object regardless of the message type. In various embodiments, message context object 505 may provide access to the Diameter message by, for example, storing a protected copy of the Diameter message in a "message" variable or storing information sufficient to access the Diameter message actually stored by the Diameter stack.

Base message context object 505 may also provide various data related to the Diameter message, but not actually stored within the message, such as data associated with the message by the Diameter stack. For example, the message context object 505 may include public variables storing identifications of an application, command, reception address, peer origin host, and peer origin realm. The message context object 505 may also include a "get" attribute that may return a handle to the message object itself that may be used, for example, to access other objects contained within message context object 505. In various embodiments, a rule may simply reference the object name to access a "get" attribute, without specifying the "get" attribute itself. For example, a rule may reference "Mirrored Message.Session-ID" to retrieve the Session-ID value, instead of "Mirrored Message.Session-ID get."

The base message context object 505 may also include an array or other grouping of AVP objects. The specific AVP objects stored in the array may be determined based on the message type and associated message definition. For example, if the message type is "Rx AAR," the AVPList may include one or more Media-Component-Description AVP objects (not shown), which may not be present if the message type is "Gx CCR." As shown, the AVPList may include AVP objects such as a Framed-IP-Address object 520 and zero or more Subscription-ID objects 525. These AVP objects 520, 525 may correspond to Framed-IP-Address AVPs and Subscription-ID AVPs, respectively, and may function as a wrapper or, or otherwise provide access to, such corresponding AVP data in the underlying message via a get attribute. The AVP objects 520, 525 may also enable modification of the underlying AVP data through actions such as a set action and a remove action, the meanings of which will be apparent. Various additional attributes and actions will be apparent. In various embodiments, the AVP objects 520, 525 be realizations of, or otherwise implement, a base AVP object class 530 which may provide some basic functionality regarding the underlying AVPs. For example, the base AVP object class 530 may provide default methods for the get attribute and set and remove actions that may be used or overridden by an implementing class such as the AVP objects 520, 525.

The mirrored message context object 510 may inherit attributes or actions from the base message context class 505, while including additional attributes or actions that provide message mirroring functionality. As shown, the mirrored message context object 510 may have "Set-Host" and "Set-Realm" actions that may, together, change the destination address of the underlying copy of the received Diameter message. These actions may accepts a parameter value and modify the destination host or destination realm, respectively, to include the parameter value. The mirrored message context object 510 may also include a "Send" action that instructs the Diameter stack to transmit the underlying copy (which may have been modified through the "Set-Host" and "Set-Realm" actions, or to direct accesses to the AVP objects 520, 525) based on its current destination address. In various embodiments, the Diameter stack may retain the copy after transmission so that the mirrored message 510 context object may further modify the copy and retransmit the message to yet another device. In this manner, the mirrored message context object 510 may enable mirroring of a single message to multiple other devices.

In some embodiments, the "Send" action may accept a parameter naming a mirror profile which, in turn, may specify one or more destinations to which the copy of the received message should be sent. In such embodiments, the "Send" action may locate a mirror profile associated with the provided parameter value, extract the destination address from the mirror profile, modify the underlying message to include the destination address, and instruct the Diameter stack to transmit the message toward the destination address. If the message profile specifies multiple destination addresses, the "Send" action may perform the extraction, modification, and instruction steps for each specified destination address. In various embodiments, the "Send" action may receive a destination host and realm as input parameters. In some such embodiments, the "Set-Host" and "Set-Realm" functions may not be implemented, as the effects thereof may be achieved by the "Send" action itself.

The spoofed message context object 515 may inherit attributes or actions from the base message context class 505, while including additional attributes or actions that provide message mirroring functionality. As shown, the spoofed message context object 515 may include a "Set-Type" action that receives a message type parameter. The "Set-Type" action may modify the application and command fields of the underlying message based on the received message type and then, based on a message definition associated with the message type, instantiate one or more AVP objects that are specific to the message type for inclusion in the AVP list. For example, the "Set-Type" action may add an AVP object for each "required" AVP associated with the message type that is not also required for Diameter messages of all types. In various embodiments, AVP objects corresponding to AVPs that are required for all Diameter message types may have already been instantiated and inserted into the AVPList upon instantiation of the Spoofed Message object 515.

In some embodiments, the spoofed message context object may be initially established with the desired message type. In such embodiments, the user interface 225 of the DRA 200 may enable the user to define at the time of rule creation the message type for the spoofed message context object. The user may be able to specifically define, for example, a new "Spoofed Gx CCR Context Object" that is to be used by a rule set. In such embodiments, the initial instantiation of the type-specific spoofed message context object may include any procedures associated with the "Set-Type" action in other embodiments including the establishment of one or more AVP objects based on an associated message definition.

FIG. 6 illustrates an exemplary data arrangement 600 for storing mirror profiles. The data arrangement 600 may reflect some of the contents of the mirror profile storage 250 of the DRA 200. The data arrangement 600 may include multiple fields, including a profile name field 610, a host field 620, and a realm field 630. The profile name field 610 may store a name used by a rule to identify a mirror profile. The host field 620 and realm field 630 may, together, identify one or more destination addresses to which a received message should be mirrored when a profile is referenced.

As an example, mirror profile 640 may be named "Warm-redundancy" and may be used when mirroring messages to a backup server to keep the backup server up-to-date with sufficient state information for use if the backup server were to be set as the active server. As such, the mirror profile 640 may specify that received messages should be mirrored to the device located at "Backup-Host-A@Our-Private-Realm." It will be understood that use of mirror profile 640 may not necessarily result in the mirroring of all traffic to the backup server; instead, a rule set that invokes the mirroring function and mirror profile 640 may define on or more conditions to identify only a subset of traffic that should be mirrored according to the mirror profile 640.

As another example, mirror profile 650 may be named "Lawful-intercept" and may be used to forward traffic to appropriate legal authorities. As shown, mirror profile 650 may specify two different destination addresses, both of which should receive a mirrored message: "ReportingServer@FBI-Realm" and "ReportingServer@CIA-Realm." The data arrangement 600 may include numerous additional mirror profiles 660.

FIG. 7 illustrates an exemplary method 700 for processing a mirror instruction including a reference to a mirror profile. The method 700 may be performed by the components of DRA 200 such as, for example, Diameter stack 205, message handler 210, rule engine 215, or context creator 230. The method 700 may be executed upon the rule engine 215 encountering an instruction that requests mirror functionality and specifies a mirror profile. For example, the method 700 may be executed based on an instruction to access the action "Mirrored Message.Send Lawful-intercept."

The method 700 may begin in step 705 and proceed to step 710 where the DRA 200 may receive a mirror profile name. For example, the context creator 232 may receive, from the rule engine 215, the profile name provided by the rule which invoked the method 700. Then, in step 715, the DRA 200 may locate the mirror profile corresponding to the provided name. For example, the DRA 200 may search through a data arrangement such as data arrangement 600 to locate a match for the provided profile name. In some embodiments, it may be possible for a rule to specify a profile name for which the DRA 200 does not store an exact match. Various modifications will be apparent for handling such a contingency such as, for example, producing an error message, locating a mirror profile having a closest-matching profile name, locating a default mirror profile, or reverting to default functionality and sending the mirrored message without further modification.

After locating a mirror profile, the DRA 200 may, in step 720, extract a destination address from the profile such as, for example, a host name and realm name. Then, in step 725, the DRA 200 may insert the destination address into the mirrored message. This step may include, for example, modifying a copy of the received message stored in the Diameter stack 205 or modifying a value carried by the mirrored message context object itself. Next, in step 730, the DRA 200 may transmit the mirrored message toward another device based on the modified destination. In some embodiments, this step may involve constructing a new outgoing Diameter message from the data stored in the mirrored message context object. After transmitting the mirrored message, the DRA 200 may determine, in step 735, whether the mirror profile specifies any additional devices to which the message should be mirrored. If so, the method 700 may loop back to step 720. Otherwise, the method 700 may proceed to end in step 740.

FIG. 8 illustrates an exemplary method 800 for associating a spoofed message context object with a specified message type. The method 800 may be performed by the components of DRA 200 such as, for example rule engine 215 or context creator 230. The method 800 may be executed upon the rule engine 215 encountering an instruction that requests that a message type be set for a spoofed message context object. For example, the method 800 may be executed based on an instruction to access the action "Spoofed Message.Set-Type Gx CCR."

The method 800 may begin in step 805 and proceed to step 810 where the DRA 200 may receive a message type. For example, the context creator 232 may receive, from the rule engine 215, the message type provided by the rule which invoked the method 800. Then, in step 815, the DRA 200 may convert the type to an application and command code. For example, the DRA 200 may refer to a lookup table that correlates a message type in the form of a string such as "Gx CCR" or "Rx AAR" to the associated application and command codes. Then, in step 820, the DRA 200 may set the application and command codes of the underlying message based on the outcome of step 815. This step may involve actually modifying a message stored in the Diameter stack 205 or modifying the contents of the spoofed message context object which will later be converted into an outgoing message.

In step 825, the DRA 200 may locate a message definition associated with the specified message type. As explained above, the message dictionary 245 may store definitions that indicate which AVPs are associated with messages of a particular type. Based on the located message definition, the DRA 200 may, in step 830, instantiate and add to the spoofed message context object one or more AVP objects corresponding to the AVPs identified in the message definition. In some embodiments, the DRA 200 may, in step 830, add an AVP object for every AVP specified in the message definition, for only AVPs specified by the message definition as required, or for only AVPs that are unique to the message definition as distinct from a generic message. In various embodiments, instantiation of the AVP objects may include adding AVPs to an underlying message stored in the Diameter stack 205. After the AVP objects have been added to the spoofed message context object, the method 800 may then proceed to end in step 835.

According to the foregoing, various embodiments enable robust and dynamic handling of various Diameter messages at a Diameter Routing Agent. In particular, by providing context objects with message mirroring and spoofing functionality, a DRA may facilitate a user in specifying complex behaviors to be followed in processing various Diameter messages. For example, a user may configure a DRA to duplicate messages to law enforcement entities, support the synchronization of redundant devices, support "warming up" of newly-installed devices, provide backward compatibility with legacy devices. Additional benefits will be apparent in view of the foregoing.

It should be apparent from the foregoing description that various exemplary embodiments of the invention may be implemented in hardware or software running on a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
    receiving a Diameter message at the DRA from an origin device, wherein the Diameter message includes a first destination address;
    establishing a context object based on receiving the Diameter message, wherein the context object is associated with a copy of the Diameter message;
    establishing a spoofed message context object, wherein the spoofed message context object implements a message converter that converts a Diameter message intercepted from a newly-installed node to another protocol, produces a spoofed message that appears to have been sent originally by an intended recipient of the Diameter message, and sends the spoofed message back to the newly-installed node that attempted to send the Diameter message to the intended recipient;
    evaluating at least one rule, comprising modifying, based on a first reference to the context object, the copy to include a second destination address; and
    transmitting the copy to another device based on the second destination address.

2. The method of claim 1, further comprising:
    transmitting the Diameter message based on the first destination address.

3. The method of claim 1, wherein transmitting the copy is performed based on a second reference to the context object, and evaluating the at least one rule further comprises:
    modifying, based on a third reference to the context object, the copy to include a third destination address, and
    transmitting, based on a fourth reference to the context object, the copy based on the third destination address.

4. The method of claim 1, wherein evaluating the at least one rule further comprises:
    modifying, based on a third reference to the context object, at least one attribute value pair (AVP) of the copy.

5. The method of claim 1, wherein the first reference to the context object identifies a mirror profile, and modifying the copy to include the second destination address further comprises:
    extracting the second destination address from the mirror profile.

6. The method of claim 1, wherein evaluating the at least one rule further comprises:
    setting, based on a first reference to the spoofed message context object, a message type of the spoofed message context object;
    determining, based on the spoofed message context object, a set of attribute value pairs (AVPs) associated with the message type; and
    constructing the spoofed message including the set of AVPs; and
    transmitting the spoofed message.

7. The method of claim 6, wherein evaluating the at least one rule further comprises:
    setting, based on a second reference to the spoofed message context object, a source address of the spoofed message, wherein the source address is different from an address of the DRA.

8. The method of claim 6, wherein establishing the spoofed message context object is performed based on receiving, by the DRA from the other device, a message responding to the copy.

9. A Diameter Routing Agent (DRA) for processing a Diameter message, the DRA comprising:
    a rule storage configured to store at least one rule;
    a Diameter stack configured to receive a Diameter message from an origin device, wherein the Diameter message includes a first destination address;
    a context creator configured to establish a context object based on receiving the Diameter message and establish a spoofed message context object, wherein the context object is associated with a copy of the Diameter message and the spoofed message context object implements a message converter that converts a Diameter message intercepted from a newly-installed node to another protocol, produces a spoofed message that appears to have been sent originally by an intended recipient of the Diameter message, and sends the spoofed message back to the newly-installed node that attempted to send the Diameter message to the intended recipient;

a rule engine configured to evaluate the at least one rule, wherein the evaluation includes modifying, based on a first reference to the context object, the copy to include a second destination address; and a message handler configured to transmit, via the Diameter stack, the copy to another device based on the second destination address.

10. The DRA of claim 9, wherein the message handler is further configured to transmit the Diameter message based on the first destination address.

11. The DRA of claim 9, wherein the message handler is configured to transmit the copy based on a second reference to the context object evaluated by the rule engine, and in evaluating the at least one rule, the rule engine is further configured to modify, based on a third reference to the context object, the copy to include a third destination address, and transmit, based on a fourth reference to the context object, the copy based on the third destination address.

12. The DRA of claim 9, wherein, in evaluating the at least one rule, the rule engine is further configured to modify, based on a third reference to the context object, at least one attribute value pair (AVP) of the copy.

13. The DRA of claim 9, wherein the first reference to the context object identifies a mirror profile, and in modifying the copy to include the second destination address, the rule engine is configured to extract the second destination address from the mirror profile.

14. The DRA of claim 9, wherein in evaluating the at least one rule, the rule engine is further configured to set, based on a first reference to the spoofed message context object, a message type of the spoofed message context object, determine, based on the spoofed message context object, a set of attribute value pairs (AVPs) associated with the message type, and construct the spoofed message including the set of AVPs; and the message handler is further configured to transmit the spoofed message via the Diameter stack.

15. The DRA of claim 14, wherein, in evaluating the at least one rule, the rule engine is further configured to set, based on a second reference to the spoofed message context object, a source address of the spoofed message, wherein the source address is different from an address of the DRA.

16. The DRA of claim 14, wherein the context creator is configured to establish the spoofed message context object based on receiving, by the Diameter stack from the other device, a message responding to the copy.

17. A non-transitory machine readable storage medium encoded with instructions for execution by a Diameter Routing Agent (DRA) for processing a Diameter message, the medium comprising:

instructions for receiving a Diameter message at the DRA from an origin device, wherein the Diameter message includes a first destination address;

instructions for establishing a context object based on receiving the Diameter message, wherein the context object is associated with a copy of the Diameter message;

instructions for establishing a spoofed message context object, wherein the spoofed message context object implements a message converter that converts a Diameter message intercepted from a newly-installed node to another protocol, produces a spoofed message that appears to have been sent originally by an intended recipient of the Diameter message, and sends the spoofed message back to the newly-installed node that attempted to send the Diameter message to the intended recipient;

instructions for evaluating at least one rule, comprising instructions for modifying, based on a first reference to the context object, the copy to include a second destination address; and instructions for transmitting the copy to another device based on the second destination address.

18. The non-transitory machine readable storage medium of claim 17, further comprising:

instructions for transmitting the Diameter message based on the first destination address.

19. The non-transitory machine readable storage medium of claim 17, wherein the instructions for transmitting the copy are configured to be executed based on a second reference to the context object, and the instructions for evaluating the at least one rule further comprise:

instructions for modifying, based on a third reference to the context object, the copy to include a third destination address; and instructions for transmitting, based on a fourth reference to the context object, the copy based on the third destination address.

20. The non-transitory machine readable storage medium of claim 17, wherein the instructions for evaluating the at least one rule further comprise:

instructions for modifying, based on a third reference to the context object, at least one attribute value pair (AVP) of the copy.

21. The non-transitory machine readable storage medium of claim 17, wherein the first reference to the context object identifies a mirror profile, and the instructions for modifying the copy to include the second destination address further comprise:

instructions for extracting the second destination address from the mirror profile.

22. The non-transitory machine readable storage medium of claim 17, wherein the instructions for evaluating the at least one rule further comprise:

instructions for setting, based on a first reference to the spoofed message context object, a message type of the spoofed message context object;

instructions for determining, based on the spoofed message context object, a set of attribute value pairs (AVPs) associated with the message type; and instructions for constructing the spoofed message including the set of AVPs; and instructions for transmitting the spoofed message.

23. The non-transitory machine readable storage medium of claim 22, wherein the instructions for evaluating the at least one rule further comprise:

instructions for, setting, based on a second reference to the spoofed message context object, a source address of the spoofed message, wherein the source address is different from an address of the DRA.

24. The non-transitory machine readable storage medium of claim 22, wherein the instructions for establishing the spoofed message context object are configured to be executed based on receiving, by the DRA from the other device, a message responding to the copy.

* * * * *